United States Patent
Zeng et al.

(10) Patent No.: US 11,461,259 B2
(45) Date of Patent: Oct. 4, 2022

(54) SYSTEMS AND METHODS FOR LOAD DETECTION ON SERIAL COMMUNICATION DATA LINES

(71) Applicant: Skyworks Solutions, Inc., Irvine, CA (US)

(72) Inventors: Qinggang Zeng, Newbury Park, CA (US); Adam Alexander Wu, Thousand Oaks, CA (US); Matthew Lee Banowetz, Marion, IA (US)

( * ) Notice: Subject to any disclaimer, the term of this patent is extended or adjusted under 35 U.S.C. 154(b) by 0 days.

(21) Appl. No.: 17/077,696

(22) Filed: Oct. 22, 2020

(65) Prior Publication Data

US 2021/0117354 A1 Apr. 22, 2021

Related U.S. Application Data

(60) Provisional application No. 62/924,344, filed on Oct. 22, 2019.

(51) Int. Cl.
| | |
|---|---|
| G06F 13/362 | (2006.01) |
| G06F 13/42 | (2006.01) |
| G06F 13/40 | (2006.01) |
| G06F 1/28 | (2006.01) |

(52) U.S. Cl.
CPC .............. *G06F 13/362* (2013.01); *G06F 1/28* (2013.01); *G06F 13/4282* (2013.01); *G06F 13/4072* (2013.01)

(58) Field of Classification Search
CPC . G06F 13/362; G06F 13/4072; G06F 13/4282
See application file for complete search history.

(56) References Cited

U.S. PATENT DOCUMENTS

| | | | |
|---|---|---|---|
| 6,625,472 B1 | 9/2003 | Farazmandnia et al. | |
| 6,678,869 B2 * | 1/2004 | Ohkubo | G06F 30/33 |
| | | | 716/113 |
| 7,127,631 B2 | 10/2006 | D'angelo et al. | |
| 7,921,320 B2 | 4/2011 | D'angelo et al. | |
| 8,242,849 B1 | 8/2012 | Seethamraju et al. | |
| 8,719,459 B2 | 5/2014 | Ripley | |
| 9,015,515 B2 | 4/2015 | D'angelo et al. | |
| 9,265,113 B2 | 2/2016 | D'angelo et al. | |
| 9,543,919 B2 | 1/2017 | Ripley | |

(Continued)

FOREIGN PATENT DOCUMENTS

| | | | |
|---|---|---|---|
| TW | 201513563 A | 4/2015 | |
| TW | 201545470 A | 12/2015 | |

*Primary Examiner* — Zachary K Huson

(74) *Attorney, Agent, or Firm* — Knobbe, Martens, Olson & Bear, LLP

(57) ABSTRACT

Systems and methods for load detection on serial communication data lines are provided herein. In certain configurations, a serial communication system includes a data line having a load capacitance and a master device configured to generate a command signal for a slave device to measure the load capacitance on the data line. The system further includes a slave device including a load detector including a controller configured to receive the command signal from the master device, provide a first fixed current to the data line, determine an amount of time elapsed while the data line is driven to a first threshold value, and determine the load capacitance of the data line based on the amount of time elapsed.

20 Claims, 9 Drawing Sheets

(56) References Cited

U.S. PATENT DOCUMENTS

| | | |
|---|---|---|
| 9,774,307 B2 | 9/2017 | Banowetz et al. |
| 9,774,716 B2 | 9/2017 | Young et al. |
| 9,935,588 B2 | 4/2018 | Ni et al. |
| 10,080,192 B2 | 9/2018 | Balteanu et al. |
| 10,218,393 B2 | 2/2019 | Banowetz et al. |
| 10,255,982 B2 | 4/2019 | Zhou et al. |
| 10,284,235 B2 | 5/2019 | Thompson et al. |
| 10,340,861 B2 | 7/2019 | Ye et al. |
| 10,628,372 B2 | 4/2020 | Ross et al. |
| 10,637,412 B2 | 4/2020 | Ye et al. |
| 11,159,189 B2 | 10/2021 | Banowetz et al. |
| 2003/0188202 A1 | 10/2003 | D'angelo et al. |
| 2006/0114194 A1* | 6/2006 | Kawasaki .............. G09G 3/325 345/76 |
| 2007/0038879 A1 | 2/2007 | D'angelo et al. |
| 2011/0218020 A1 | 9/2011 | Ripley et al. |
| 2013/0100993 A1 | 4/2013 | Ripley |
| 2015/0028771 A1 | 1/2015 | D'angelo et al. |
| 2015/0035455 A1 | 2/2015 | D'angelo et al. |
| 2016/0134251 A1 | 5/2016 | Ripley |
| 2017/0003733 A1 | 1/2017 | Banowetz |
| 2017/0040962 A1 | 2/2017 | Banowetz et al. |
| 2017/0069441 A1* | 3/2017 | Mishrikey ................ H01H 9/54 |
| 2017/0093559 A1 | 3/2017 | Banowetz et al. |
| 2017/0187857 A1 | 6/2017 | Young et al. |
| 2017/0192933 A1 | 7/2017 | Banowetz et al. |
| 2017/0223632 A1 | 8/2017 | Balteanu et al. |
| 2017/0309231 A1* | 10/2017 | Li ....................... G09G 3/3225 |
| 2018/0145648 A1 | 5/2018 | Ye et al. |
| 2018/0151240 A1 | 5/2018 | Zhou et al. |
| 2018/0316316 A1 | 11/2018 | Banowetz et al. |
| 2019/0180833 A1 | 6/2019 | Zhou et al. |
| 2019/0273475 A1 | 9/2019 | Ye et al. |

\* cited by examiner

SYSTEMS AND METHODS FOR LOAD DETECTION ON SERIAL COMMUNICATION DATA LINES

CROSS-REFERENCE TO RELATED APPLICATION(S)

This application claims the benefit of U.S. Provisional Application No. 62/924,344, filed Oct. 22, 2019, which is hereby incorporated by reference in its entirety.

BACKGROUND

Field

Embodiments of the invention relate to electronic systems, and in particular, to serial interfaces for electronic systems.

Description of the Related Technology

Certain electronic systems can include a serial interface for writing data to and/or reading data to various blocks of the system. For example, a radio frequency (RF) system can include a mobile industry processor interface radio frequency front-end (MIPI RFFE) bus for writing and reading registers of various RF components.

SUMMARY

The systems, methods and devices of this disclosure each have several innovative aspects, no single one of which is solely responsible for the desirable attributes disclosed herein.

In one aspect, there is provided a serial communication system comprising: a data line having a load capacitance; a master device configured to generate a command signal for a slave device to measure the load capacitance on the data line; and a slave device including a load detector including a controller configured to receive the command signal from the master device, provide a first fixed current to the data line, determine an amount of time elapsed while the data line is driven to a first threshold value, and determine the load capacitance of the data line based on the amount of time elapsed.

In some embodiments, the load detector further includes a first current source and a first switch connected between the first current source and the data line, the controller further configured to control the first switch to selectively connect the first current source to the data line in response to the command signal.

In various embodiments, the load detector further includes a comparator configured to compare a voltage on the data line to the first threshold value and output a first signal indicative of the voltage on the data line reaching the first threshold value, the controller further configured to determine the amount of time elapsed based on the first signal from the comparator.

In a number of embodiments, the load detector further includes a second current source and a second switch connected between the second current source and the data line, the controller further configured to control the second switch to selectively connect the second current source to the data line based on the first signal from the comparator.

In several embodiments, the comparator is further configured to compare the voltage on the data line to a second threshold value and output a second signal indicative of the voltage on the data line reaching the second threshold value, the controller further configured to determine the amount of time elapsed based on the second signal from the comparator.

In certain embodiments, the load detector further includes a look-up-table storing load capacitance values for a predetermined number of expected elapsed time values, the controller further configured to determine the load capacitance on the data line using the look-up-table.

In some embodiments, the controller is further configured to determine the load capacitance on the data line using a mathematical function stored in the load detector.

In various embodiments, the slave device further includes an output driver configured to drive the data line and a register than defines an output strength of the output driver, the controller further configured to program the register based on the determined load capacitance.

Another aspect is a slave device, comprising: a load detector including a controller configured to receive a command signal from a master device via a data line, provide a first fixed current to the data line, determine an amount of time elapsed while the data line is driven to a first threshold value, and determine the load capacitance of the data line based on the amount of time elapsed.

In some embodiments, the load detector further includes a first current source and a first switch connected between the first current source and the data line, the controller further configured to control the first switch to selectively connect the first current source to the data line in response to the command signal.

In various embodiments, the load detector further includes a comparator configured to compare a voltage on the data line to the first threshold value and output a first signal indicative of the voltage on the data line reaching the first threshold value, the controller further configured to determine the amount of time elapsed based on the first signal from the comparator.

In a number of embodiments, the load detector further includes a second current source and a second switch connected between the second current source and the data line, the controller further configured to control the second switch to selectively connect the second current source to the data line based on the first signal from the comparator.

In several embodiments, the comparator is further configured to compare the voltage on the data line to a second threshold value and output a second signal indicative of the voltage on the data line reaching the second threshold value, the controller further configured to determine the amount of time elapsed based on the second signal from the comparator.

In certain embodiments, the load detector further includes a look-up-table storing load capacitance values for a predetermined number of expected elapsed time values, the controller further configured to determine the load capacitance on the data line using the look-up-table.

In some embodiments, the controller is further configured to determine the load capacitance on the data line using a mathematical function stored in the load detector.

In various embodiments, the slave device further includes an output driver configured to drive the data line and a register than defines an output strength of the output driver, the controller further configured to program the register based on the determined load capacitance.

Yet another aspect provides a method comprising: receiving, at controller of a load detector of a slave device, a command signal from a master device via a data line; providing a first fixed current to the data line; determining, via the controller, an amount of time elapsed while the data line is driven to a first threshold value; and determining, via the controller, the load capacitance of the data line based on the amount of time elapsed.

In some embodiments, the method further comprises: controlling, via the controller, a first switch to selectively connect a first current source of the load detector to the data line in response to the command signal.

In various embodiments, the method further comprises: comparing, via a comparator of the load detector, a voltage on the data line to the first threshold value; outputting, from the comparator, a first signal indicative of the voltage on the data line reaching the first threshold value; and determining, via the controller, the amount of time elapsed based on the first signal from the comparator.

In a number of embodiments, the method further comprises: controlling, via the controller, a second switch to selectively connect a second current source of the load detector to the data line based on the first signal from the comparator.

In several embodiments, the method further comprises: comparing, via the comparator, the voltage on the data line to a second threshold value; outputting, from the comparator, a second signal indicative of the voltage on the data line reaching the second threshold value; and determining, via the controller, the amount of time elapsed based on the second signal from the comparator.

In certain embodiments, the method further comprises: storing load capacitance values for a predetermined number of expected elapsed time values on a look-up-table of the load detector; and determining, via the controller, the load capacitance on the data line using the look-up-table.

In some embodiments, the method further comprises: determining, via the controller, the load capacitance on the data line using a mathematical function stored in the load detector.

In various embodiments, the method further comprises: driving the data line via an output driver of the slave device; storing a value indicative of an output strength of the output driver in a register of the slave device; and programing, via the controller, the register based on the determined load capacitance.

BRIEF DESCRIPTION OF THE DRAWINGS

Embodiments of this disclosure will now be described, by way of non-limiting example, with reference to the accompanying drawings.

DETAILED DESCRIPTION OF EMBODIMENTS

Figure 1:
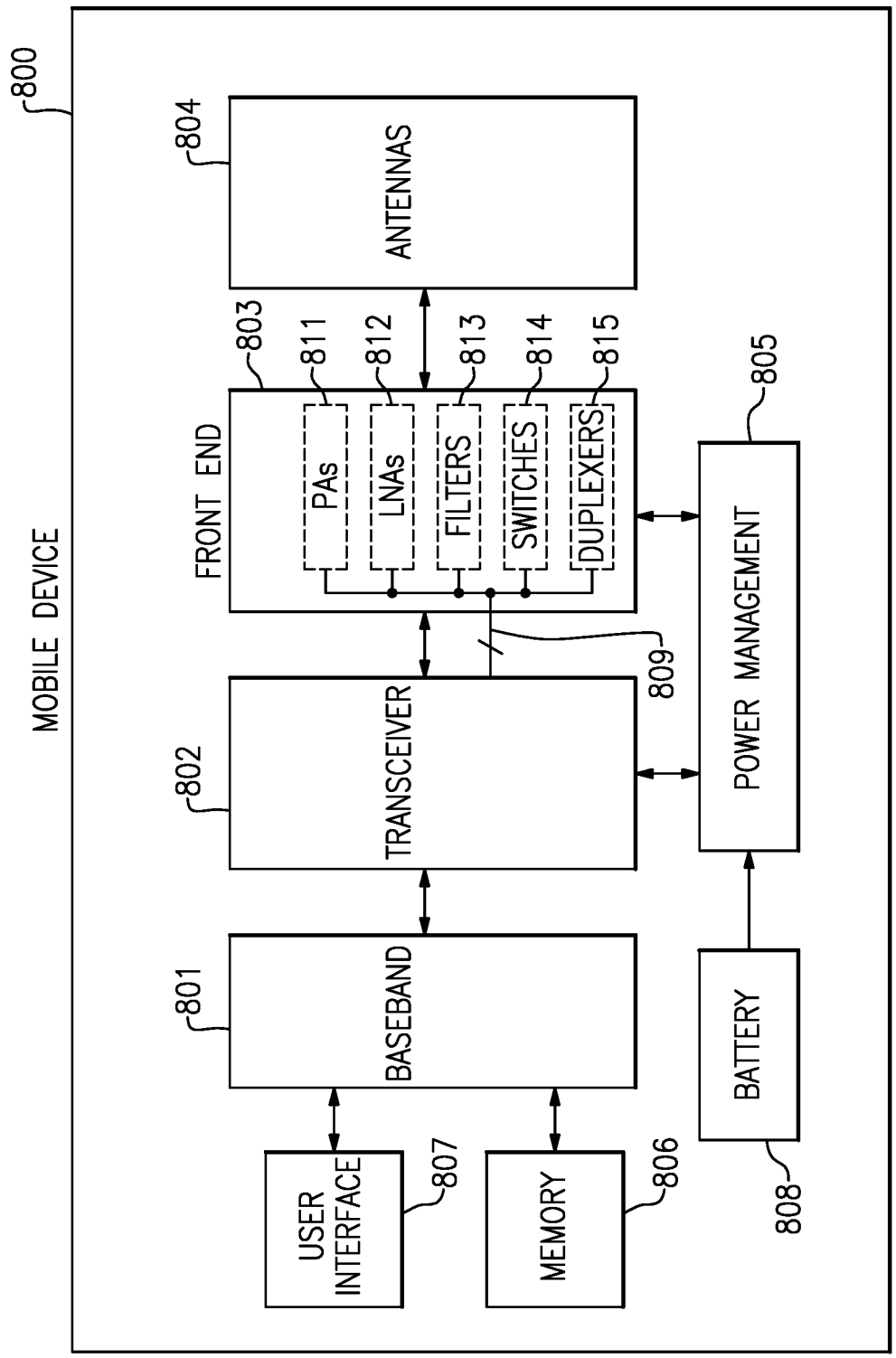
FIG. 1 is a schematic diagram of one embodiment of a mobile device.

The following detailed description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

A serial interface or bus can include a master device and one or more slave devices, which can be distributed across multiple integrated circuits (ICs). The master device can broadcast an interface command over the serial interface to the slave devices, such as an instruction to write a certain register associated with a particular slave device. To identify the selected slave device and register, a slave address and register identifier can be broadcasted over the interface as part of the interface command. Each slave device can analyze the slave address to determine if the interface command is designated for the slave device, and if so, the selected slave device uses the register identifier to locate the targeted register.

Examples of serial interfaces or buses include, but are not limited to, a mobile industry processor interface radio frequency front-end (MIPI RFFE) bus and an inter-integrated circuit ($I^2C$) bus.

A radio frequency (RF) system includes multiple RF components, which can also be referred to herein as RF blocks or modules. Examples of RF components for an RF system include, but are not limited to, power amplifiers, switches, couplers, low noise amplifiers (LNAs), and/or filters. Additionally, all or part of these RF components can be controlled by a shared serial interface or bus. Additionally, the serial interface can be used for sending interface commands to configure the system during initialization and/or while fully operational.

In certain implementations, one or more of the RF components can include an RF core circuit and an energy management (EM) core circuit. The RF core circuit can include one or more RF inputs connected to one or more RF outputs through highly sensitive signal paths. Additionally, the RF core circuit is controlled by the EM core circuit, such as by controlling the signal level of one or more analog control signals. For instance, the one or more analog controls can include, but are not limited to, bias currents, bias voltages, reference voltages, and/or controllable power supplies.

The EM core circuit can include a slave device that receives commands via the serial interface. For example, the serial interface can be used to program registers with configuration data that can be decoded to control the RF core circuit. The configuration data stored in the registers can include information for setting, for instance, one more analog control signal values, a power mode, a frequency band of operation, and/or a wide variety of other settings.

The slaves devices receive control telegrams (also referred to herein as interface commands) from a master device, which can be located, for instance, on an RFIC or transceiver die.

FIG. 1 is a schematic diagram of one embodiment of a mobile device 800. The mobile device 800 includes a baseband system 801, a transceiver 802, a front end system 803, antennas 804, a power management system 805, a memory 806, a user interface 807, and a battery 808.

As shown in in FIG. 1, the transceiver 802 is connected to the front end system 803 using a serial interface 809 that is implemented in accordance with the teachings herein. All or part of the illustrated RF components can be controlled by the serial interface 809 to configure the mobile device 800 during initialization and/or while fully operational. Although an example in which a transceiver controls a serial interface is shown, other implementations are possible. For example, other systems can control a serial interface, including, but not limited to, base band systems and/or microcontrollers.

Although the mobile device 800 illustrates one example of an RF system that can include one or more features of the present disclosure, the teachings herein are applicable to electronic systems implemented in a wide variety of ways.

The mobile device 800 can be used communicate using a wide variety of communications technologies, including, but not limited to, 2G, 3G, 4G (including LTE, LTE-Advanced, and LTE-Advanced Pro), 5G, WLAN (for instance, Wi-Fi), WPAN (for instance, Bluetooth and ZigBee), WMAN (for instance, WiMax), and/or GPS technologies.

The transceiver 802 generates RF signals for transmission and processes incoming RF signals received from the antennas 804. It will be understood that various functionalities associated with the transmission and receiving of RF signals can be achieved by one or more components that are collectively represented in FIG. 1 as the transceiver 802. In one example, separate components (for instance, separate circuits or dies) can be provided for handling certain types of RF signals.

The front end system 803 aids is conditioning signals transmitted to and/or received from the antennas 804. In the illustrated embodiment, the front end system 803 includes power amplifiers (PAs) 811, low noise amplifiers (LNAs) 812, filters 813, switches 814, and duplexers 815. However, other implementations are possible.

For example, the front end system 803 can provide a number of functionalities, including, but not limited to, amplifying signals for transmission, amplifying received signals, filtering signals, switching between different bands, switching between different power modes, switching between transmission and receiving modes, duplexing of signals, multiplexing of signals (for instance, diplexing or triplexing), or some combination thereof.

In certain implementations, the mobile device 800 supports carrier aggregation, thereby providing flexibility to increase peak data rates. Carrier aggregation can be used for both Frequency Division Duplexing (FDD) and Time Division Duplexing (TDD), and may be used to aggregate a plurality of carriers or channels. Carrier aggregation includes contiguous aggregation, in which contiguous carriers within the same operating frequency band are aggregated. Carrier aggregation can also be non-contiguous, and can include carriers separated in frequency within a common band or in different bands.

The antennas 804 can include antennas used for a wide variety of types of communications. For example, the antennas 804 can include antennas for transmitting and/or receiving signals associated with a wide variety of frequencies and communications standards.

In certain implementations, the antennas 804 support MIMO communications and/or switched diversity communications. For example, MIMO communications use multiple antennas for communicating multiple data streams over a single radio frequency channel. MIMO communications benefit from higher signal to noise ratio, improved coding, and/or reduced signal interference due to spatial multiplexing differences of the radio environment. Switched diversity refers to communications in which a particular antenna is selected for operation at a particular time. For example, a switch can be used to select a particular antenna from a group of antennas based on a variety of factors, such as an observed bit error rate and/or a signal strength indicator.

The mobile device 800 can operate with beamforming in certain implementations. For example, the front end system 803 can include phase shifters having variable phase controlled by the transceiver 802. Additionally, the phase shifters are controlled to provide beam formation and directivity for transmission and/or reception of signals using the antennas 804. For example, in the context of signal transmission, the phases of the transmit signals provided to the antennas 804 are controlled such that radiated signals from the antennas 804 combine using constructive and destructive interference to generate an aggregate transmit signal exhibiting beam-like qualities with more signal strength propagating in a given direction. In the context of signal reception, the phases are controlled such that more signal energy is received when the signal is arriving to the antennas 804 from a particular direction. In certain implementations, the antennas 804 include one or more arrays of antenna elements to enhance beamforming.

The baseband system 801 is coupled to the user interface 807 to facilitate processing of various user input and output (I/O), such as voice and data. The baseband system 801 provides the transceiver 802 with digital representations of transmit signals, which the transceiver 802 processes to generate RF signals for transmission. The baseband system 801 also processes digital representations of received signals provided by the transceiver 802. As shown in FIG. 1, the baseband system 801 is coupled to the memory 806 of facilitate operation of the mobile device 800.

The memory 806 can be used for a wide variety of purposes, such as storing data and/or instructions to facilitate the operation of the mobile device 800 and/or to provide storage of user information.

The power management system 805 provides a number of power management functions of the mobile device 800. In certain implementations, the power management system 805 includes a PA supply control circuit that controls the supply voltages of the power amplifiers 811. For example, the power management system 805 can be configured to change the supply voltage(s) provided to one or more of the power amplifiers 811 to improve efficiency, such as power added efficiency (PAE).

As shown in FIG. 1, the power management system 805 receives a battery voltage from the battery 808. The battery 808 can be any suitable battery for use in the mobile device 800, including, for example, a lithium-ion battery.

Figure 2:
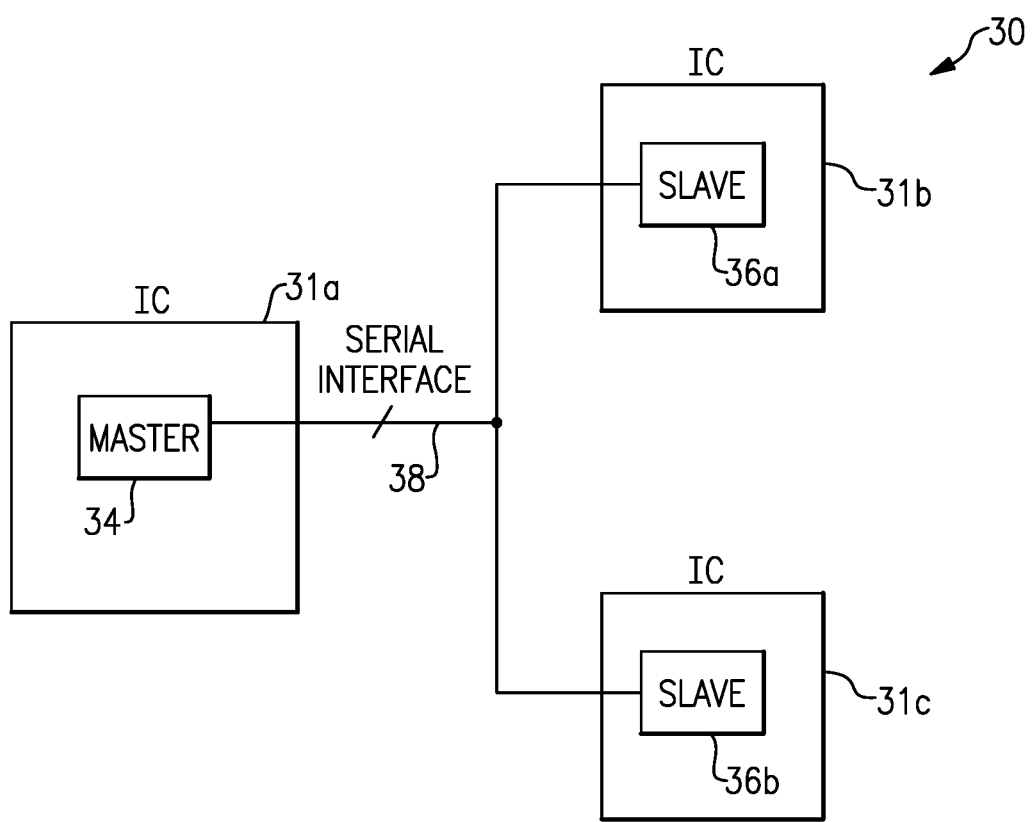
FIG. 2 is a schematic diagram of one example of an electronic system including a serial interface.

FIG. 2 is a schematic diagram of one example of an electronic system 30 that can be configured for load detection on serial communication data lines. As shown in FIG. 2, the electronic system 30 includes a first IC 31a, a second IC 31b, a third IC 31c, and a serial interface 38. The first IC 31a includes a master device 34, the second IC 31b includes a first slave device 36a, and the third IC 31c includes a second slave device 36b. The first, second and third ICs 31a-31c are electrically connected over the serial interface 38, which can be, for example, a MIPI RFFE interface, an I²C interface, or any other suitable interface or bus.

Although the electronic system 30 is illustrated for the case of three ICs, the electronic system 30 can be adapted to include more or fewer ICs. Additionally, although only one slave device is illustrated on each of the second and third ICs 31b, 31c, the second and/or third IC can include additional slave devices.

The electronic system 30 can be, for example, an RF system incorporated in a smartphone, a base station, a handset, a wearable electronic device, or a tablet. In one example, the first IC 31 corresponds to an RFIC or transceiver, the second IC 31b corresponds to a first RF component (for instance, a power amplifier), and the third IC 31c corresponds to a second RF component (for instance, RF switches). Although one example of components for the serial interface 38 has been described, other implementations are possible.

Figure 3:
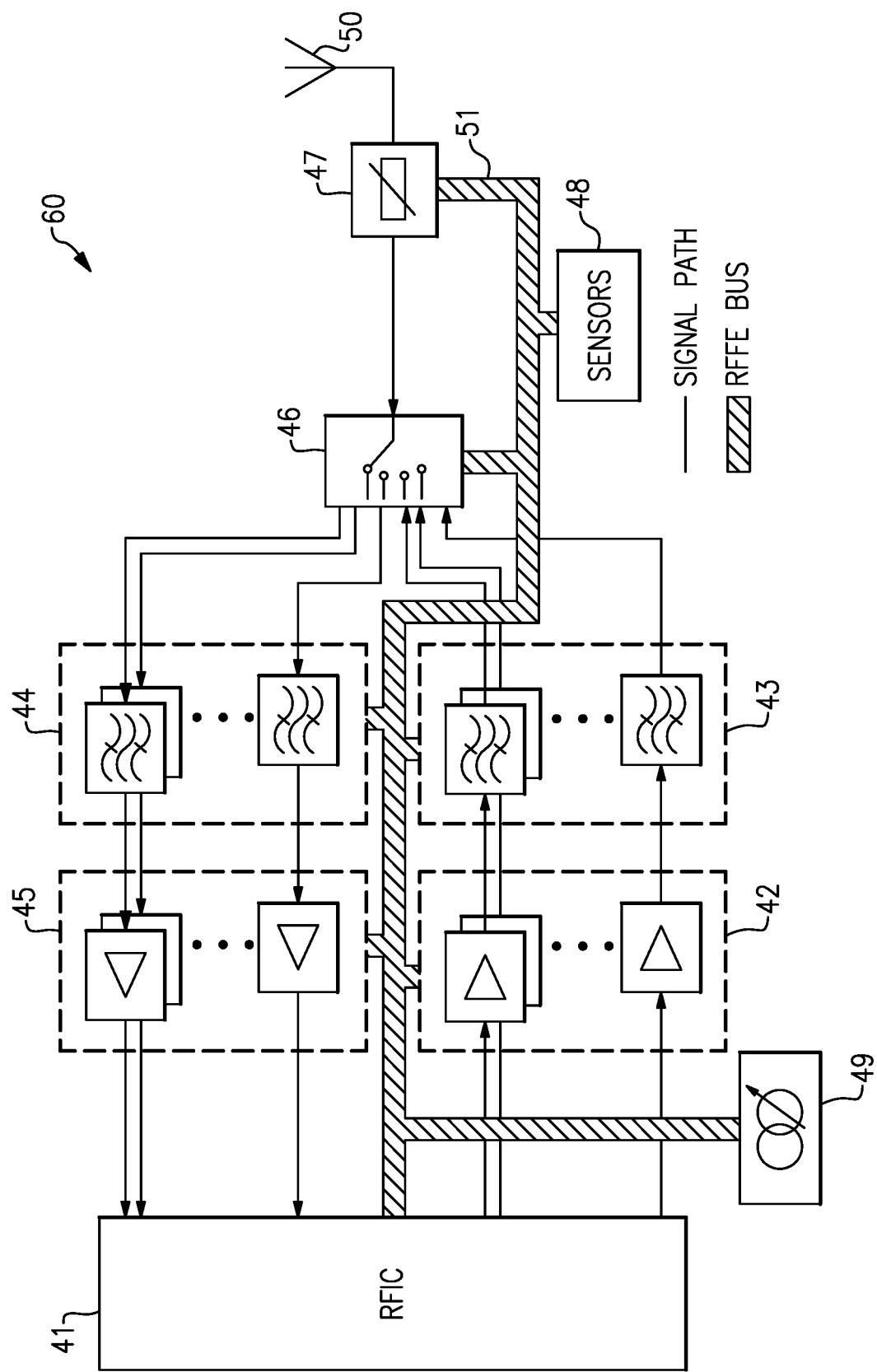
FIG. 3 is a schematic diagram of one embodiment of an RF system including a MIPI RFFE interface.

FIG. 3 is a schematic diagram of one embodiment of an RF system 60 including a MIPI RFFE interface or bus 51. The RF system 60 further includes an RFIC 41, a power amplifier module 42, a transmit filter module 43, a receive filter module 44, a low noise amplifier (LNA) module 45, an antenna switch module 46, a coupler module 47, a sensor module 48, a biasing module 49, and an antenna 50.

As shown in FIG. 3, various components of the RF system 60 are interconnected by the MIPI RFFE bus 51. Additionally, the RFIC 41 includes a master device of the MIPI RFFE bus 51, and each of the RF components includes a slave device of the MIPI RFFE bus 51. The master device of the RFIC 41 sends interface commands over the MIPI RFFE bus 51 to configure the RF system 60 during initialization and/or while fully operational.

Although FIG. 3 illustrates one example of an RF system that can include RF components controlled over a serial interface, such as a MIPI RFFE bus, the teachings herein are applicable to RF systems implemented in a wide variety of ways.

Figure 4A:
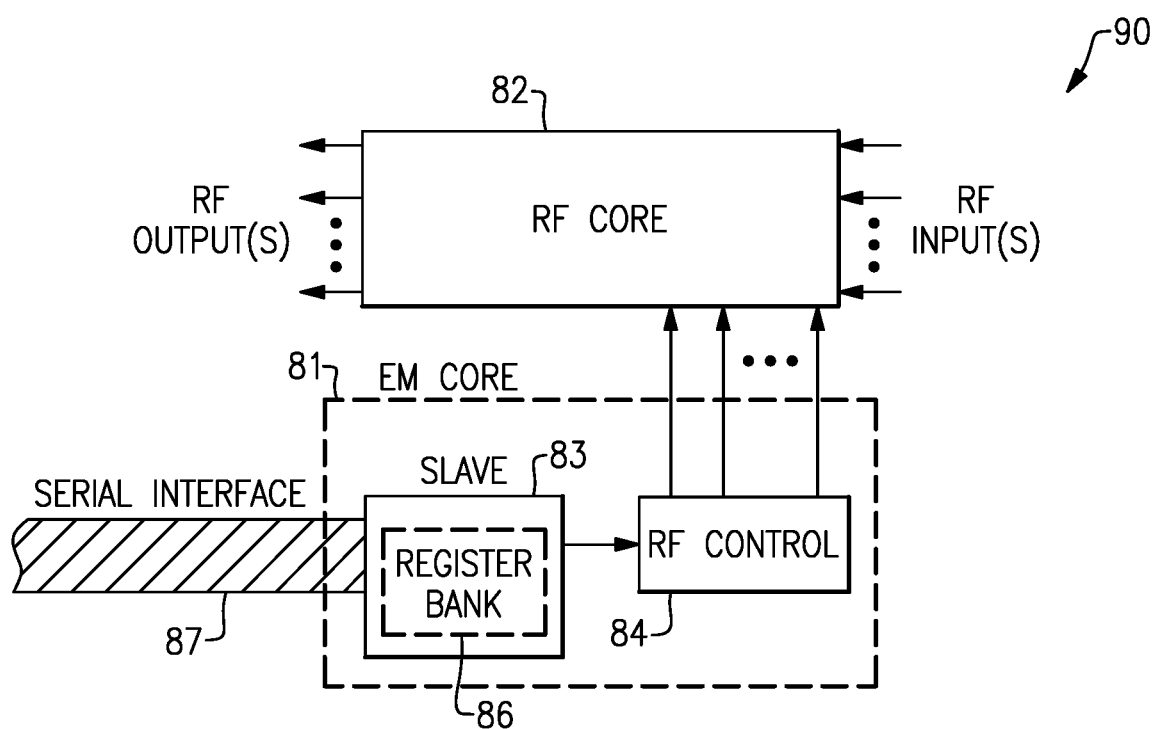
FIG. 4A is a schematic diagram of one embodiment of an RF module including a slave device of a serial interface.

FIG. 4A is a schematic diagram of one embodiment of an RF module 90 including a slave device of a serial interface. The RF module 90 includes an energy management (EM) core circuit 81 and an RF core circuit 82. The RF module 90 can represent any of the RF modules or components of FIG. 3. For example, the RF core circuit 82 can represent power amplifier circuitry, low noise amplifier circuitry, switch circuitry, filter circuitry, and/or a wide variety of RF circuitry.

In the illustrated embodiment, the EM core circuit 81 includes a slave device 83 and an RF control circuit 84. The slave device 83 includes a register bank 86, which stores configuration data received over a serial interface 87.

The RF control circuit 84 generates one or more control signals for controlling the EM core circuit 81. In certain implementations, at least one of the control signals has an analog signal value that is controlled based on data received over the serial interface and stored in the register bank 86.

The serial interface 87 includes interface signals (for instance, an interface clock signal and an interface data signal) which are common or shared by the slave devices of the serial interface 87. For example, as shown in FIG. 2, a serial interface can include two or more slave devices that are controlled by a master device. In certain implementations, the serial interface 87 also provides at least one power supply voltage to the slave devices.

The slave device 83 has a unique slave address used for identification. Thus, when a specific RF module is being programmed via the serial interface 87, other RF modules connected to the serial interface 87 are exposed to transient switching activity (for instance, toggling of the interface clock signal and the interface data signal), even though the interface command is not directed toward these RF modules.

Figure 4B:
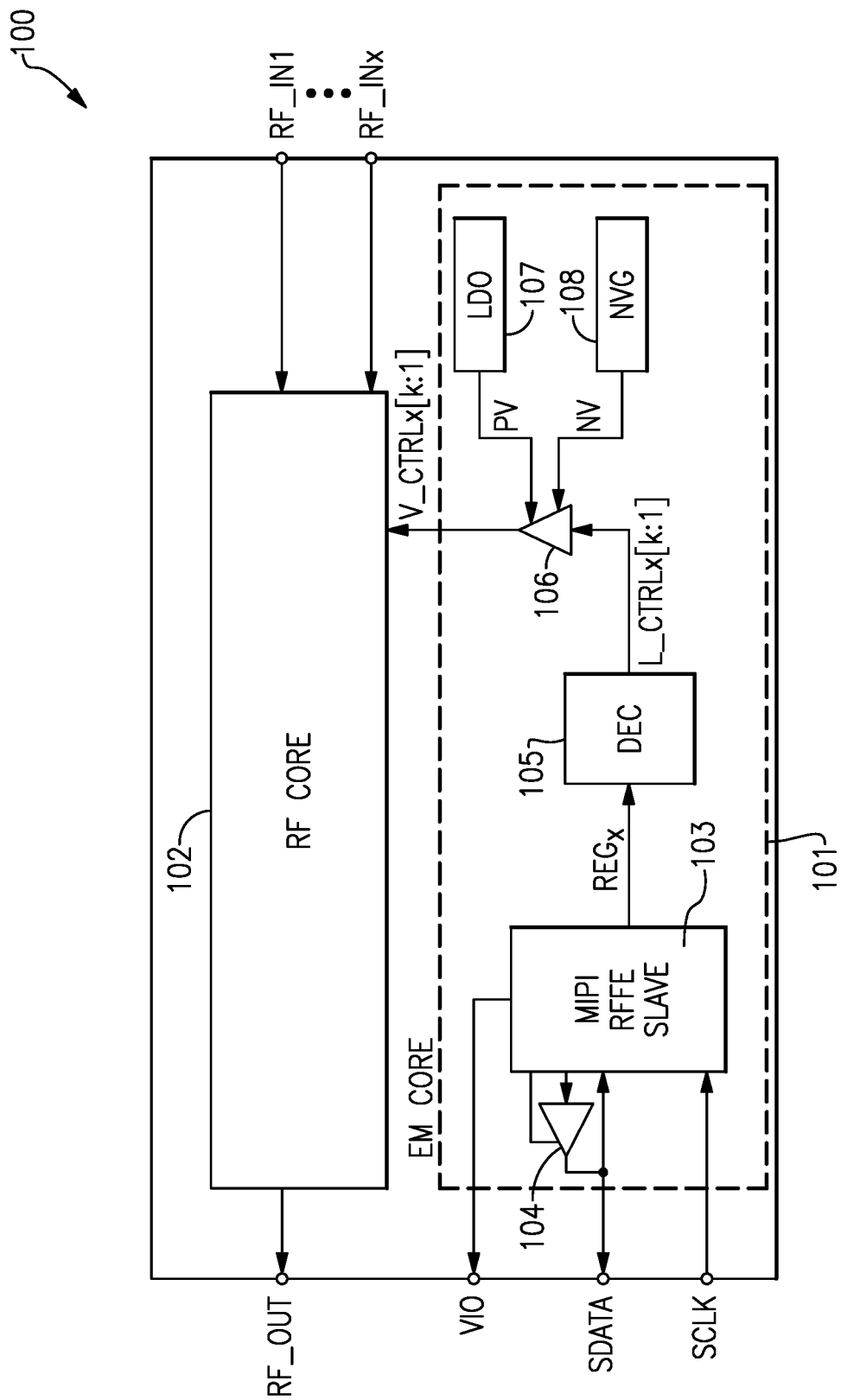
FIG. 4B is a schematic diagram of another embodiment of an RF module including a slave device of a MIPI RFFE interface.

FIG. 4B is a schematic diagram of one embodiment of an RF module 100 including a slave device of a MIPI RFFE interface. The RF module 100 includes an EM core circuit 101 and an RF core circuit 102.

In the illustrated embodiment, the EM core circuit 101 includes a MIPI RFFE slave device 103, a bus driver 104, a decoder 105, an analog control signal generator 106, a low dropout (LDO) regulator 107, and a negative voltage generator (NVG) 108. The MIPI RFFE slave device 103 is coupled to a MIPI RFFE bus including an interface clock signal (SCLK), an interface data signal (SDATA), and an interface supply voltage (VIO). Although one example of an energy management core circuit is shown, the teachings herein are applicable to energy management core circuits implemented in a wide variety of ways.

As shown in FIG. 4B, the illustrated RF core circuit 102 includes RF signal inputs RF_IN1 . . . RF_INx and an RF signal output RF_OUT. Additionally, the RF signal output RF_OUT is connected to the RF signal inputs RF_IN1 . . . RF_INx through noise sensitive signal paths of the RF core circuit 102. Although a specific example of inputs and outputs is shown, other implementations are possible, including implementations with other numbers of RF signal inputs and/or RF signal outputs.

The RF module 100 can represent any of the RF modules or components of FIG. 3. For example, the RF core circuit 102 can represent power amplifier circuitry, low noise amplifier circuitry, switch circuitry, filter circuitry, and/or a wide variety of RF circuitry.

With continuing reference to FIG. 4B, the RF core circuit 102 is controlled by the EM core circuit 101. For example, in the illustrated embodiment, the EM core circuit 101 generates analog control voltages (V_CTRLx[k:1]), which have analog voltage values controlled by data received over the serial interface. An example with an integer k analog control voltages is shown. An energy management control circuit can control an RF core circuit using any suitable number of analog control voltages and/or using other types of control signals. Thus, although a specific example of an RF module is shown in FIG. 4B, RF modules can be implemented in a wide variety of ways.

The EM core circuit 101 includes the MIPI RFFE slave device 103, which receives commands via the MIPI RFFE interface (SDATA/SCLK/VIO). For example, the serial interface can be used to program registers of the MIPI RFFE slave device 103 with configuration data, and the register outputs $REG_x$ can be decoded by the decoder 105 to generate logic control signals (L_CTRLx[k:1]) used to control values of the analog control voltages (V_CTRLx[k:1]). To aid in generating the analog control voltages, the analog control signal generator 106 receives a positive voltage PV from the LDO regulator 107 and a negative voltage NV from the NVG 108, in this embodiment.

The interface clock signal SCLK and interface data signal SDATA are common or shared by the slave devices of the MIPI RFFE interface. Additionally, each slave device has a unique slave address used for identification. Thus, when a specific RF module is being programmed via the MIPI RFFE interface, other RF modules of the MIPI RFFE interface are exposed to transient switching activity of the interface clock signal SCLK and interface data signal SDATA, even though the interface command is not directed toward these RF modules.

Data Line Load

Figure 5:
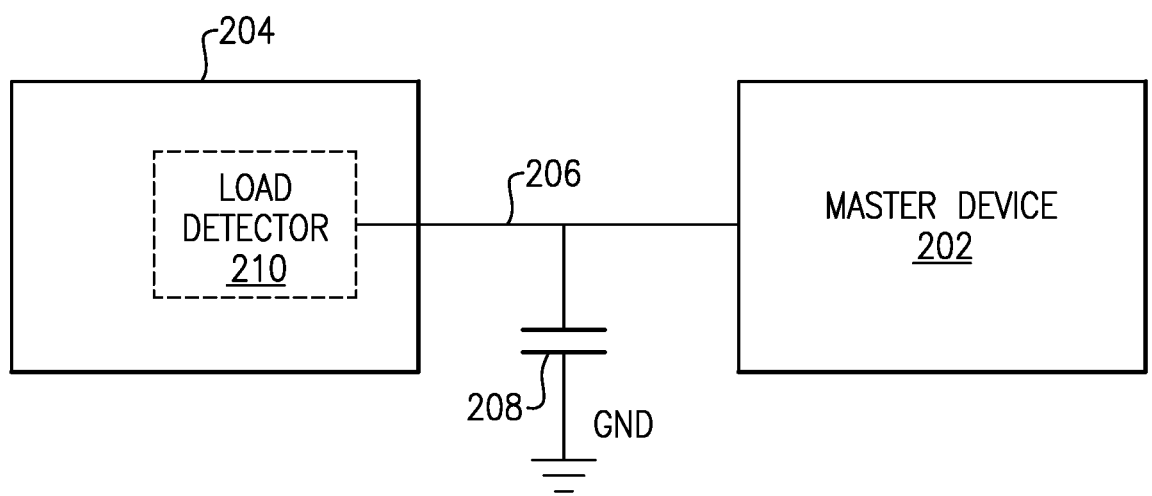
FIG. 5 is a schematic diagram of one embodiment of a serial interface in accordance with aspects of this disclosure.

FIG. 5 is a schematic diagram of one embodiment of a serial interface in accordance with aspects of this disclosure. The interface includes a master device 202 and one or more slave devices 204 (a single slave device 204 is illustrated for convenience) which are connected via a bus 206. Each of the slave device(s) 204 may have a load detector 210 configured to detect the load capacitance 208 on the bus 206 as described herein. As discussed above, a serial interface can be embodied as a MIPI RFFE bus or an I²C bus, but are not limited thereto. Aspects of this disclosure will be discussed in relation to MIPI RFFE embodiments, however, this disclosure can also be applied to other serial bus technologies.

The load capacitance on a MIPI SDATA line can range from a few pF to hundreds of pF. Serial interfaces typically have a specification for the minimum and maximum transition delay for signals to be correctly transmitted over the bus. As used herein, transition delay may refer to the amount of time taken to drive the bus to the desired voltage. Thus, the output driver (e.g., the bus driver 104 of FIG. 4B) can be configured to be adjusted to the appropriate strength to meet the max transition delay spec and min transition delay spec based on the load capacitance 208 of the bus 206. One technique for adjusting the output driver strength to meet the delay specs involves the master device 202 manually setting the each of the slave device's 204 output driver strengths using 4 bit control words to compensate for the load condition of SDATA line. For example, the master device 202 may individually address each of the slave devices 204 and provide the 4 bit control word (or any other length control word) to program a register on the corresponding slave device 204 that the slave device 204 uses to set the output driver strength. Such manual setting of each slave device's 204 output driver strength under control of the master device 202 may use a relatively larger amount of control circuits, software, and communication time between the master and slave devices 202 and 204 to implement the setup process before communication can begin.

Aspects of this disclosure relate to systems and methods than can use a simplified process to set the output strengths of each of the slave devices 204. In some embodiments, the slave device 204 output strength can be set without the use of control circuits. For example, each slave device 204 can include a load detector 210 configured to automatically detect the load condition without the master device 202 generating control words to program the slave devices 204. In some embodiments, the load detector 210 may be included as a part of the output driver of a slave device 204, however, in other embodiments, the load detector 210 can be included as a circuit separate from the output driver.

Figure 6:
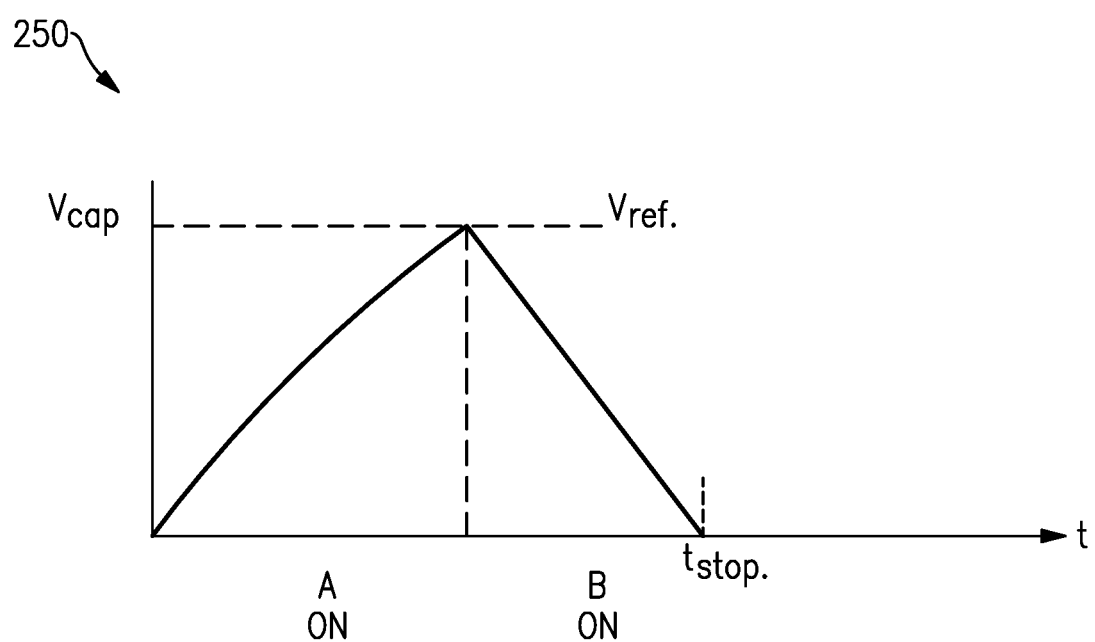
FIG. 6 is a plot that illustrates the response of a bus when applied with constant current in accordance with aspects of this disclosure.

FIG. 6 is a plot that illustrates the response of a bus when applied with constant current in accordance with aspects of this disclosure. As shown in FIG. 6, the voltage Vcap on the bus 206 may rise in a substantially linear fashion when applied with a constant voltage, as illustrated by the section labeled "A." After the voltage $V_{cap}$ reached a reference voltage $V_{ref}$, illustrated in the section labeled "B," the voltage $V_{cap}$ on the bus 206 may fall in a substantially linear fashion when applied with a constant current running in the opposite direction from the current applied during time period "A." The amount of time $t_{stop}$ taken for the voltage $V_{cap}$ on the bus 206 to reach the reference voltage $V_{ref}$ and then return to ground (e.g., which may be set to 0 V) may be proportional to the load capacitance 208 of the bus 206. Thus, one way in which the load detector 210 can be configured to measure the load capacitance 208 is to drive the bus 206 using one or more constant current sources and measure the amount of time $t_{stop}$ taken to reach the reference voltage $V_{ref}$ and then return to ground.

Figure 7:
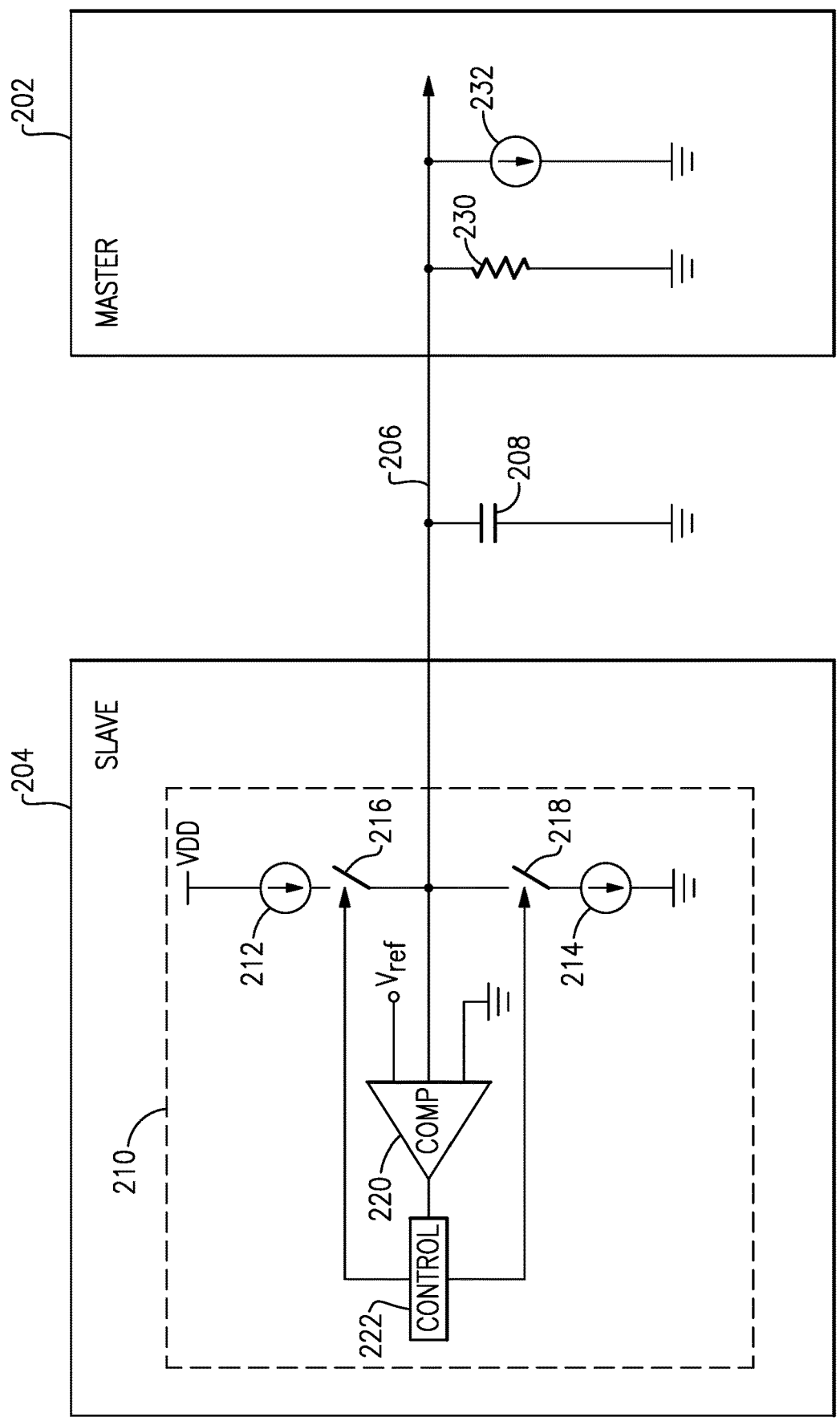
FIG. 7 is a schematic diagram of another embodiment of a serial interface illustrating an implementation of a load detector in accordance with aspects of this disclosure.

FIG. 7 is a schematic diagram of another embodiment of a serial interface illustrating an implementation of a load detector in accordance with aspects of this disclosure. Similar to FIG. 5, the interface includes a master device 202 and one or more slave devices 204 which are connected via a bus 206. Each of the slave device(s) 204 includes a load detector 210 configured to detect the load capacitance 208 on the bus 206. Although the master device 202 may have a number of different circuits configured to drive each of the slave devices 204, the master device can be modeled as a resistor 230 and a current source 232 connected between the bus 206 and ground.

In the embodiment of FIG. 7, the load detector comprises two current sources 212 and 214, two switches 216 and 218, a comparator 220, and controller 222. The first current source 121 is connected between a voltage supply VDD and the first switch 216. The first switch 216 is configured to selectively connect the first current source 212 to the bus 206. The second current source 214 is connected between ground and the second switch 218. The second switch 218 is configured to selectively connect the second current source 214 to the bus 206. The comparator 220 is connected to a reference voltage $V_{ref}$, the bus 206 and ground. The comparator 200 is configured to output a signal indicative of whether the voltage $V_{cap}$ on the bus 206 is substantially equal to the reference voltage $V_{ref}$, is substantially equal to ground, or is not equal to either the reference voltage $V_{ref}$ nor ground.

The controller 222 is configured to control the state (e.g., either open or closed) of each of the first and second switches 216 and 218 based on the signal output from the comparator 220. The controller 222 can also be configured to determine the length of time $t_{stop}$ taken to drive the bus 206 to the reference voltage $V_{ref}$ from an initial ground voltage and then drive the bus 206 back to ground. Thus controller 222 can determine the load capacitance 208 of the bus 206 based on the length of time $t_{stop}$ and set the strength of the output driver based on the length of time $t_{stop}$. In some embodiments, the controller 222 can determine the load capacitance 208 as a function of the length of time $t_{stop}$ (e.g., using an equation). In other embodiments, the controller 222 can use a look-up-table (not illustrated), that has load capacitance values stored for a predetermined number of expected elapsed time values.

Figure 8:
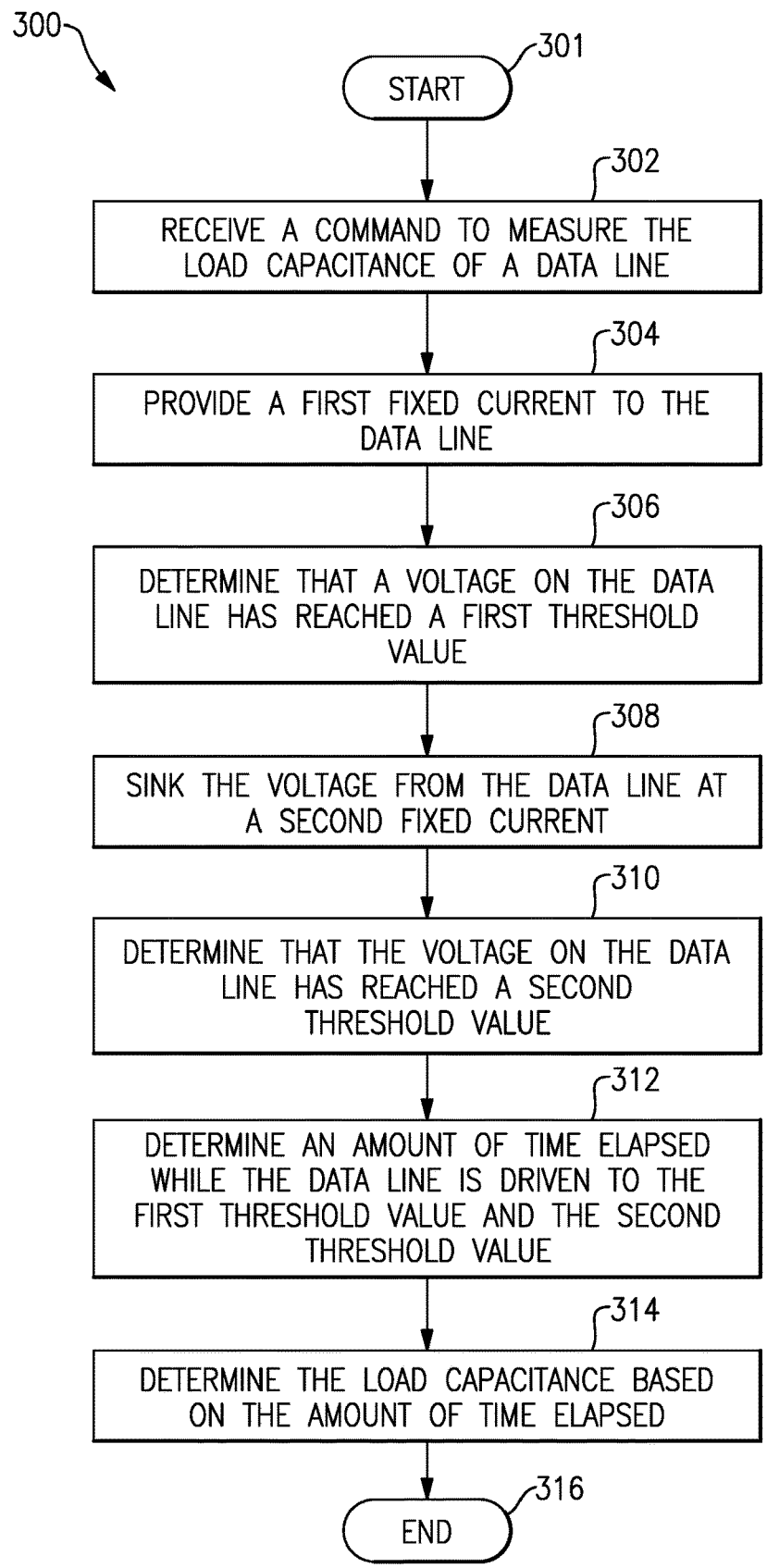
FIG. 8 illustrates an embodiment of a method for detecting the load capacitance of a bus for a serial interface in accordance with aspects of this disclosure.

FIG. 8 illustrates an embodiment of a method for detecting the load capacitance of a bus for a serial interface in accordance with aspects of this disclosure. Certain steps of the method 300 can be performed by the load detector 210 of a slave device 204. The method 300 begins at block 301. At block 302, the slave device 204 receives a command to measure the load capacitance of a data line (e.g., the bus 206). At block 304, the load detector 210 provides a first fixed current to the data line 304. For example, the controller 222 can close the first switch 216 and open the second switch 218, thereby connecting the first current source 212 to the bus 206.

At block 306, the load detector 210 determines that a voltage on the data line has reached a first threshold value. For example, the comparator 220 can compare the voltage $V_{cap}$ on the bus 206 to the reference voltage $V_{ref}$ and output a signal indicative of the voltage $V_{cap}$ on the bus 206 reaching the reference voltage $V_{ref}$. The controller 222 can determine that the voltage $V_{cap}$ on the bus 206 has reached the reference voltage $V_{ref}$ based on the signal from the comparator 220.

At block 308, the load detector 210 sinks the voltage from the data line at a second fixed current. For example, the controller 222 can open the first switch 216 and close the second switch 218, thereby connecting the second current source 214 to the bus 206. The controller 222 can connect the second current source 214 to the bus 206 in response to determining that the voltage $V_{cap}$ on the bus 206 has reached the reference voltage $V_{ref}$.

At block 310, the load detector 210 determines that the voltage on the data line has reached a second threshold value. For example, the comparator 220 can compare the voltage $V_{cap}$ on the bus 206 to ground and output a signal indicative of the voltage $V_{cap}$ on the bus 206 reaching ground. In other embodiments, the comparator 220 can compare the voltage $V_{cap}$ on the bus 206 to a second reference voltage other than ground. The controller 222 can determine that the voltage $V_{cap}$ on the bus 206 has reached ground based on the signal from the comparator 220.

At block 312, the load detector 210 determines an amount of time elapsed while the data line is driven to the first threshold value and the second threshold value. For example, the controller 222 may include a timer than measures the amount of time elapsed between initially providing the first fixed current to the data line at block 304 and determining that the voltage on the data line has reached a second threshold value at block 312.

At block 314, the load detector 210 determines the load capacitance based on the amount of time elapsed. The amount of time elapsed may be proportional to the load capacitance of the data line. Depending on the embodiment, the load detector 210 may determine the load capacitance based on the time elapsed using a mathematical formula (e.g., a linear equation that relates the time elapsed to the load capacitance or a function that provides the load capacitance as a function of time elapsed) or using a look-up-table that has load capacitance values stored for a predetermined number of expected elapsed time values. The values of the look-up-table may be determined empirically by measuring the elapsed times for a number of known load capacitance values using the load capacitance measurement techniques described herein. The load detector 210 can then set the strength of the output driver of the slave device 204 based on the determined load capacitance. Depending on the embodiment, setting the strength of the output driver may also be performed using a mathematical formula and/or a look up table. The method 300 ends at block 316.

The method 300 may be performed individually by each slave device 204 connected to the bus 206. In order to prevent each slave device 204 from simultaneously accessing the bus 206 (e.g., by connecting one of the first and second current sources 212 and 214 to the bus 206), the master device 202 may provide commands to measure the load capacitance of the data line to each of the slave devices 204 in turn.

As described above, embodiments in which the master device 202 sets the output driver strength of the slave devices 204 using 4 bits control words to accommodation the load condition of SDATA line, the master device 202 includes a large amount of complex control circuits, software, and communication time between the master device 202 and the slave devices 204 to implement the setup process. However, in embodiments in which the slave devices 204 are configured to detect the load capacitance on the bus 206 directly, the control circuits can be removed from the master device 202 and the process to setup the strength of output drivers for the slave devices 204 is simplified.

In addition, under certain circumstances, the load condition can change. In embodiments in which the master device 202 sets the output driver strength, it may not be possible to update the output driver strength to match the change in the load condition, leading failure to meet the maximum and minimum delay specs. For example, the master device 202 may not be configured to measure changes in the load condition of the bus 206.

In contrast, according to aspects of this disclosure in which the slave devices 204 are configured to measure the load capacitance of the data line, the control circuits can be removed from the master device 202 and the process to setup the strength of the output drivers of each of the slave devices 204 can be simplified. That is, the related communication between the master device 202 and the slave devices 204 to set up the output driver strength along with the and related software can be completely removed from the serial interface system. The load detector 210 of each slave device 204 can automatically detect the load condition without interference from the master device 202 and intelligently set the output driver strength accordingly. If the load condition changes at any time, the slave devices 204 can dynamically adjust the driver strength. Aspects of this disclosure eliminate the possibility of failure of setup or incorrect measurement of load condition, which is static in the embodiments in which control bits from the master device 202 are used to set slave device 204 output driver strength. Aspects of this disclosure also simplify the setup process, measurement of load, and software development.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A serial communication system comprising:
   a data line having a load capacitance;
   a master device configured to generate a command signal; and
   a slave device including a load detector, the load detector including a controller configured to receive the command signal from the master device, provide a first fixed current to the data line, determine an amount of time elapsed while the data line is driven to a first threshold value, and determine the load capacitance of the data line based on the amount of time elapsed.

2. The system of claim 1 wherein the load detector further includes a first current source and a first switch connected between the first current source and the data line, the controller further configured to control the first switch to selectively connect the first current source to the data line in response to the command signal.

3. The system of claim 2 wherein the load detector further includes a comparator configured to compare a voltage on the data line to the first threshold value and output a first signal indicative of the voltage on the data line reaching the first threshold value, the controller further configured to determine the amount of time elapsed based on the first signal from the comparator.

4. The system of claim 3 wherein the load detector further includes a second current source and a second switch connected between the second current source and the data line, the controller further configured to control the second switch to selectively connect the second current source to the data line based on the first signal from the comparator.

5. The system of claim 4 wherein the comparator is further configured to compare the voltage on the data line to a second threshold value and output a second signal indicative of the voltage on the data line reaching the second threshold value, the controller further configured to determine the amount of time elapsed based on the second signal from the comparator.

6. The system of claim 1 wherein the load detector further includes a look-up-table storing load capacitance values for a predetermined number of expected elapsed time values, the controller further configured to determine the load capacitance on the data line using the look-up-table.

7. The system of claim 1 wherein the controller is further configured to determine the load capacitance on the data line using a mathematical function stored in the load detector.

8. The system of claim 1 wherein the slave device further includes an output driver configured to drive the data line and a register than defines an output strength of the output driver, the controller further configured to program the register based on the determined load capacitance.

9. A slave device, comprising:
   a load detector including a controller configured to receive a command signal from a master device via a data line, provide a first fixed current to the data line, determine an amount of time elapsed while the data line is driven to a first threshold value, and determine a load capacitance of the data line based on the amount of time elapsed.

10. The device of claim 9 wherein the load detector further includes a first current source and a first switch connected between the first current source and the data line, the controller further configured to control the first switch to selectively connect the first current source to the data line in response to the command signal.

11. The device of claim 10 wherein the load detector further includes a comparator configured to compare a voltage on the data line to the first threshold value and output a first signal indicative of the voltage on the data line reaching the first threshold value, the controller further configured to determine the amount of time elapsed based on the first signal from the comparator.

12. The device of claim 11 wherein the load detector further includes a second current source and a second switch connected between the second current source and the data line, the controller further configured to control the second switch to selectively connect the second current source to the data line based on the first signal from the comparator.

13. The device of claim 12 wherein the comparator is further configured to compare the voltage on the data line to a second threshold value and output a second signal indicative of the voltage on the data line reaching the second threshold value, the controller further configured to determine the amount of time elapsed based on the second signal from the comparator.

14. The device of claim 9 wherein the load detector further includes a look-up-table storing load capacitance values for a predetermined number of expected elapsed time values, the controller further configured to determine the load capacitance on the data line using the look-up-table.

15. The device of claim 9 wherein the controller is further configured to determine the load capacitance on the data line using a mathematical function stored in the load detector.

16. The device of claim 9 wherein the slave device further includes an output driver configured to drive the data line and a register than defines an output strength of the output driver, the controller further configured to program the register based on the determined load capacitance.

17. A method comprising:
  receiving, at controller of a load detector of a slave device, a command signal from a master device via a data line;
  providing a first fixed current to the data line;
  determining, via the controller, an amount of time elapsed while the data line is driven to a first threshold value; and
  determining, via the controller, a load capacitance of the data line based on the amount of time elapsed.

18. The method of claim 17 further comprising controlling, via the controller, a first switch to selectively connect a first current source of the load detector to the data line in response to the command signal.

19. The method of claim 17 further comprising:
  comparing, via a comparator of the load detector, a voltage on the data line to the first threshold value and outputting a first signal indicative of the voltage on the data line reaching the first threshold value; and
  determining, via the controller, the amount of time elapsed based on the first signal from the comparator.

20. The method of claim 19 further comprising controlling, via the controller, a second switch to selectively connect a second current source of the load detector to the data line based on the first signal from the comparator.

* * * * *